Patented Aug. 3, 1937

2,088,590

UNITED STATES PATENT OFFICE 2,088,590

STABILIZED AQUEOUS SOLUTION OF TANNIC ACID

William H. Engels and Harold J. Becker, Rahway, N. J., assignors to Merck & Co., Inc., Rahway, N. J., a corporation of New Jersey No Drawing. Application July 30, 1936, Serial No. 93,426

7 Claims. (Cl. 23—250)

This invention relates to the stabilization of tannic acid in aqueous solution.

Aqueous solutions of tannic acid have been successfully used for the treatment of severe burns. When such a solution is applied to the burned areas, a thin brown tissue coagulum is formed which renders the toxin produced by the burn insoluble, and prevents its absorption into the circulatory system.

However, tannic acid in solution is extremely unstable, being rapidly converted into gallic acid which is not suitable for precipitating or coagulating protein and, therefore, not effective for the desired use. For this reason, it has been the general practice, heretofore, to prepare the solutions extemporaneously, at the time of each application, which resulted in an inevitable loss of time and detracted from the benefits derived from very prompt application of the solution to the lesion.

This instability of tannic acid in aqueous solution is understood to be due to fermentation by the action of certain micro-organisms or fungi, as well as to decomposition due to exposure to atmospheric oxygen.

Our objective, therefore, was to find a suitable combination of agents to cooperatively inhibit the growth of the organisms in the tannic acid solution and to protect the solution against the chemical action of atmospheric oxygen, and which combination of agents would at the same time be non-toxic to the injured skin area, as well as non-reactive to the tannic acid in solution and to each other. A combination of certain esters of p-hydroxybenzoic acid and alkali metal bisulfites has been found to be eminently satisfactory for attaining the combined and interrelated effects and limitations.

We found that benzoic acid or calicylic acid in concentrations of approximately 0.1% would serve to prevent the growth of microorganisms in 5% tannic acid solutions. However, such solutions are not suitable for use in cooperation with the antoxidant which we have found most suitable, namely, sodium bisulfite, because, being strongly acid, they will accelerate the decomposition of the bisulfite by setting free sulphur dioxide.

We have now found that these disadvantages of decomposition of the antoxidant are overcome by the use of certain esters of p-hydroxybenzoic acid. These esters, while being very efficient anti-fermentative agents for the particular purposes indicated, even in high dilution, are neutral in reaction and, therefore, inert with respect to sodium bisulfite.

Among the esters of this group which we have found to be eminently satisfactory for our purpose are those of methyl, ethyl, propyl, iso-propyl, n-butyl, iso-butyl, benzyl, and the like.

The n-butyl ester of p-hydroxybenzoic acid is particularly effective for the intended purpose, and gives an excellent stable solution when used in connection with sodium bisulfite. It is a neutral substance, exhibiting potent germicidal and fungicidal properties even in high dilutions; it does not exert any untoward effects on the preferred antioxidant, sodium bisulfite, and is non-toxic when applied to the severely injured tissue of the burned area.

A preferred method of preparing our stabilized tannic acid solution, therefore, consists of adding about 0.01% p-hydroxybenzoic acid n-butyl ester and about 0.25% sodium bisulfite to a 5% solution of U. S. P. tannic acid in distilled water. Such a solution will remain stable practically indefinitely if kept under the usual ordinary conditions of cautions against exposure to air and light and, therefore, may be instantly applied from stock containers to the affected areas by any appropriate means, as by spray, compress, etc., as may be indicated.

As indicated, other esters of p-hydroxybenzoic acid may be substituted for the n-butyl ester given in the above formula. However, in such case, the ester concentration may have to be higher, according to its relative germicidal strength as compared with the stronger and therefore preferable n-butyl ester. Thus, for instance in the case of the methyl and the iso-propyl esters, the amount required would be about 0.02%.

It is also possible to use a larger amount of sodium bisulfite, although concentrations greater than 0.5% are not usually advisable due to the possibility of irritating sensitive skins; concentrations of sodium bisulfite within the range of 0.10% to 0.5% have been found perfectly safe and satisfactory.

We claim as our invention:

1. A stabilized aqueous solution of tannic acid comprising a neutral ester of p-hydroxybenzoic acid and an alkali metal bisulfite.

2. A stabilized aqueous solution of tannic acid comprising a neutral alkyl ester of p-hydroxybenzoic acid and an alkali metal bisulfite.

3. A stabilized aqueous solution of tannic acid comprising the benzyl ester of p-hydroxybenzoic acid and an alkali metal bisulfite.

4. A stabilized aqueous solution of tannic acid comprising p-hydroxybenzoic acid n-butyl ester and sodium bisulfite.

5. A stabilized aqueous solution of tannic acid comprising p-hydroxybenzoic acid benzyl ester and sodium bisulfite.

6. A stabilized aqueous solution of tannic acid consisting of about 5% U. S. P. tannic acid, about 0.01% p-hydroxybenzoic acid n-butyl ester, and about 0.25% sodium bisulfite.

7. The method of stabilizing aqueous solutions of tannic acid which comprises adding thereto a neutral ester of p-hydroxybenzoic acid and an alkali metal bisulfite.

WILLIAM H. ENGELS.
HAROLD J. BECKER.